(12) United States Patent
Schneider et al.

(10) Patent No.: US 11,771,523 B2
(45) Date of Patent: Oct. 3, 2023

(54) METHOD FOR THE DESIGN AND MANUFACTURE OF A DENTAL COMPONENT

(71) Applicant: DENTSPLY SIRONA INC., York, PA (US)

(72) Inventors: Hans-Christian Schneider, Einhausen (DE); Oliver Nowarra, Leimen (DE); Daniel Weiß, Heddesheim (DE); Peter Fornoff, Reichelsheim (DE)

(73) Assignee: DENTSPLY SIRONA INC., York, PA (US)

( * ) Notice: Subject to any disclaimer, the term of this patent is extended or adjusted under 35 U.S.C. 154(b) by 551 days.

(21) Appl. No.: 16/708,531

(22) Filed: Dec. 10, 2019

(65) Prior Publication Data

US 2020/0179082 A1 Jun. 11, 2020

(30) Foreign Application Priority Data

Dec. 10, 2018 (EP) .................................... 18211405

(51) Int. Cl.
*A61C 5/77* (2017.01)
*A61C 13/00* (2006.01)
(Continued)

(52) U.S. Cl.
CPC ............ *A61C 5/77* (2017.02); *A61C 13/0019* (2013.01); *A61C 13/0022* (2013.01); *B33Y 80/00* (2014.12); *G06N 3/02* (2013.01)

(58) Field of Classification Search
None
See application file for complete search history.

(56) References Cited

U.S. PATENT DOCUMENTS 7,735,542 B2 * 6/2010 Marshall .................. A61C 5/77
164/35
9,326,833 B2 * 5/2016 Kirchner ................ A61C 8/005
(Continued)

FOREIGN PATENT DOCUMENTS

DE 19518702 C2 3/1999
JP 2000331194 A 11/2000
(Continued)

OTHER PUBLICATIONS

European Search Report; EP 18211405; May 20, 2019 (completed).

*Primary Examiner* — Jacob J Cigna
(74) *Attorney, Agent, or Firm* — DENTSPLY SIRONA INC.

(57) ABSTRACT

The present invention relates to a method for the design and manufacture of a dental component with a surface, wherein a 3D model of the dental component is designed by means of a CAD unit and the dental component is manufactured by a CAM unit on the basis of the 3D model. In order to provide a method which significantly shortens the time required for the design and manufacture of a dental component, so that the length of the dental session at which the patient must be present is shortened, it is inventively proposed that the 3D model is manufactured in at least one first design step, in which a first 3D submodel is designed with at least one first surface section, and a second design step in which a second 3D submodel is designed with at least one second surface section, wherein the first design step is completed before the second design step and the CAM unit begins the manufacture of the first surface section of the dental component based on the first 3D submodel before the design of the second 3D submodel is completed.

18 Claims, 7 Drawing Sheets

(51) Int. Cl.
  *G06N 3/02* (2006.01)
  *B33Y 50/02* (2015.01)
  *B33Y 80/00* (2015.01)

(56) References Cited

U.S. PATENT DOCUMENTS

| | | | |
|---|---|---|---|
| 9,414,897 B2* | 8/2016 | Wu | G06F 30/00 |
| 9,767,223 B2* | 9/2017 | Fisker | A61C 13/0004 |
| 9,801,697 B2* | 10/2017 | Rubbert | A61C 13/0004 |
| 11,007,040 B2* | 5/2021 | Azernikov | G06F 30/10 |
| 11,185,395 B2* | 11/2021 | Barak | A61C 1/0015 |
| 11,298,216 B2* | 4/2022 | Grobbee | A61C 13/09 |
| 2006/0106484 A1* | 5/2006 | Saliger | A61C 13/0004 |
| | | | 433/172 |
| 2007/0128580 A1* | 6/2007 | Mormann | A61C 8/0051 |
| | | | 433/201.1 |
| 2009/0319068 A1* | 12/2009 | Sager | A61C 5/20 |
| | | | 706/14 |
| 2011/0086328 A1* | 4/2011 | Wedeking | A61C 8/00 |
| | | | 433/175 |
| 2011/0171604 A1* | 7/2011 | Durbin | A61C 13/0004 |
| | | | 700/98 |
| 2012/0052186 A1 | 3/2012 | Junglas | |
| 2012/0296613 A1* | 11/2012 | Kirchner | A61C 8/0083 |
| | | | 703/1 |
| 2012/0308963 A1* | 12/2012 | Hasselgren | A61C 13/20 |
| | | | 700/98 |
| 2013/0316302 A1* | 11/2013 | Fisker | A61C 8/0077 |
| | | | 703/1 |
| 2015/0320520 A1* | 11/2015 | Schulter | A61C 5/77 |
| | | | 433/199.1 |
| 2017/0086953 A1* | 3/2017 | Rubbert | A61L 27/3804 |
| 2020/0147473 A1* | 5/2020 | Maloney | B33Y 10/00 |

FOREIGN PATENT DOCUMENTS

| | | |
|---|---|---|
| JP | 2013540513 A | 11/2013 |
| JP | 2014032473 A | 2/2014 |
| JP | 2018502624 A | 2/2018 |

* cited by examiner

METHOD FOR THE DESIGN AND MANUFACTURE OF A DENTAL COMPONENT

CROSS-REFERENCE TO RELATED APPLICATIONS

This patent application claims the benefit of and priority to EP Application No. 18211405.8 filed Dec. 10, 2018, which is herein incorporated by reference for all purposes.

FIELD OF THE INVENTION

The present invention relates to a method for the design and manufacture of a dental component. The dental component can be, for example, a dental prosthesis, such as an inlay, an onlay, an overlay, a veneer, a dental crown, a bridge, an implant crown or an immediate implant. The dental component may also be a bite splint or an impression tray.

BACKGROUND OF THE INVENTION

In the following, the known methods will be described using the example of the design and manufacture of a dental prosthesis and in particular a dental crown. The dental prosthesis may have an attachment element connected to a jaw for the purposes of attachment. For example, the attachment element may be a prepared tooth (also known as a prepared tooth stump). Alternatively, the attachment element could also be an abutment of an implant.

For the design and manufacture of the dental prosthesis, a 3D model of the dental prosthesis is generally first designed by means of a CAD unit, and then the dental prosthesis is manufactured by a CAM unit on the basis of the 3D model.

Usually, after the dentist has prepared the tooth to receive a dental prosthesis, the three-dimensional shape of the prepared tooth is determined.

This is often performed with the assistance of a digitizing method. The three-dimensional shape of the prepared tooth is then in many cases sent to an external dental laboratory so that a dental technician then designs and manufactures a corresponding dental prosthesis based on the 3D shape.

Until the design and manufacture of the dental prosthesis, the patient must live with the correspondingly prepared tooth, which may mean a significant limitation for the patient.

Therefore, dental prostheses are more and more frequently being created at the dentist's practice without the assistance of a dental technician. Such a method is known for example from DE 195 18 702 C2.

In a first step, the geometry of the tooth to be restored and prepared and if necessary its surroundings, and possibly also the antagonist teeth, are electronically recorded and stored.

In a next step, the image of the prepared tooth is interpreted. The preparation edge (also frequently called the preparation border or the preparation line), i.e. the edge which surrounds the surface to which the dental prosthesis is applied on the tooth to be restored, is identified in the image. This can either be realized manually by an experienced dentist or partially or even fully automatically by a software using an algorithm.

Finally, a 3D model of the dental prosthesis is designed with the assistance of a CAD unit. After the design of the 3D model, the dental component is finally ground or milled from a block of material in a CAM unit in the known method.

The dental prosthesis can then be inserted during the session into the jaw of the patient and attached to the attachment element by means of a UV-curable adhesive.

Especially in the case of dental prostheses with complicated shapes, the procedure described above may take a relatively long time.

What is particularly time-consuming here is, on the one hand, the design of the visible side of the dental prosthesis, because the dentist's experience plays a role and because the exact shape may need to be determined after consultation with the patient, and on the other hand, the subtractive machining of the non-visible base part, i.e. the section facing the attachment element, of the dental prosthesis.

In the same way, a bite splint or an individualized impression tray can be designed and manufactured, wherein these components are not attached to the jaw.

Based on the prior art described above, the object of the present invention is to provide a method which significantly reduces the time required for the design and manufacture of a dental component in order to shorten the length of the dental session at which the patient must be present.

SUMMARY OF THE INVENTION

According to the invention, this object is achieved in the method described above in that the 3D model is manufactured in at least one first design step, in which a first 3D submodel is designed with at least one first surface section, and a second design step in which a second 3D submodel is designed with at least one second surface section, wherein the first design step is completed before the second design step and the CAM unit begins manufacturing of the first surface section of the dental component based on the first 3D submodel before the design of the second 3D submodel is completed.

According to the invention, therefore, the 3D model is divided into 3D submodels, which are designed sequentially and/or at different speeds. The manufacture of the dental component is begun as soon as the design of the first 3D submodel is completed.

In a preferred embodiment, the manufacture of the dental component is performed by means of a subtractive manufacturing method from a workpiece blank. It is particularly preferred to use a machining method such as milling or grinding.

In an alternative embodiment, the manufacture of the dental component is performed by means of an additive manufacturing method, preferably via 3D printing.

In a preferred embodiment, the first surface section of the first 3D submodel corresponds to a first surface section of the dental component, and the second surface section of the second 3D submodel corresponds to a second surface section of the dental component. In other words, a portion of the surface of the dental component is represented by the first 3D submodel, and a different portion of the surface of the dental component is represented by the second 3D submodel.

As soon as the first 3D submodel defining a first surface section of the dental component to be created has been designed, the fabrication of this surface section of the dental component is begun while the second 3D submodel is still being designed.

Basically, the method according to the invention begins with the manufacture of the dental component as soon as first information about at least one portion of the surface structure of the dental component is available. It is not necessarily required to divide the design into two design steps. Instead, it may be beneficial to split the design into more than two design steps, each creating a corresponding 3D submodel. As soon as a 3D submodel has been created, it is possible to begin manufacture of the surface sections of the dental component defined by this 3D submodel.

In an alternative embodiment, an algorithm is used to design a 3D rough model as a first 3D submodel in the first design step and in the second design step a 3D fine model as a second 3D submodel is designed, wherein either
  a) a subtractive manufacturing method is used and the volume of the 3D rough model is greater than the volume of the 3D fine model, or
  b) an additive manufacturing method is used and the volume of the 3D rough model is smaller than the volume of the 3D fine model.

In this case, the volume of the 3D rough model is limited by the at least one surface section of the first 3D submodel, and the volume of the 3D fine model is limited by the at least one surface section of the second 3D submodel.

Instead of dividing the 3D model into 3D submodels that represent different surface sections of the dental component, this embodiment is divided into a rough model and a fine model.

The rough model can be created automatically in a computer-assisted fashion with the assistance of an algorithm. Empirical values can be used for this purpose. For example, the design of the 3D rough model can be performed automatically using artificial neural networks for machine learning (Convolutional Neural Network, CNN), such as deep learning, based on 3D models of previous designs.

Alternatively or in combination, the design of the 3D rough model can be performed automatically on the basis of a dental component type. Dental component types may include dental prosthesis types, such as inlay, onlay, veneer, dental crown, bridge, implant crown or immediate implant, optionally subdivided according to the position of the tooth to which the dental prosthesis is to be attached, or component types, such as bite splint or impression tray.

Before the beginning of the design, it is generally known which type of dental component is to be manufactured. This knowledge can be used automatically in the design of the 3D rough model. For example, if it is determined that a tooth crown should be manufactured for the upper left canine (ref. 23), this information can be used for the design of the 3D rough model.

It is also customary to use a ceramic hard core frame with a layered veneering ceramic as the blank for the dental component. The individual layers of the ceramic have a different coloring, so that the color of the dental component to be manufactured depends on the positioning of the 3D fine model within the blank. As a result, the 3D rough model can be essentially the same as the 3D fine model, but when using a subtractive manufacturing method, the volume of the 3D rough model is larger than the volume of the 3D fine model, so that the 3D fine model can be moved within the 3D rough model in order to achieve the desired coloring. As soon as the position of the 3D fine model has been determined in the 3D rough model, the dental component can finally be created.

The modeling of the visible surface of the dental component is often time-consuming during the performance of the second design step. In addition, it must be determined at which places there should be contact between the dental component and the opposing tooth during chewing. In this case, the patient's time-consuming involvement may also be required. However, these essentially design-related interventions of the experienced dentist have only relatively small effects on the surface sections of the dental component to be manufactured.

With the 3D rough model, the rough shape of the dental component can easily be determined before the second design step is completed. A dental component can then be manufactured, for example, in a scrubbing process that corresponds roughly to the desired shape of the dental component. The finishing process is performed as soon as the second design step is finished, and therefore the exact desired final shape of the dental component is defined.

Care must be taken, however, that in the case of a subtractive manufacturing method, the volume of the fine model lies within the volume of the rough model. It is therefore not possible to remove so much material from the blank during the manufacture of the rough model that the fine model can no longer be manufactured.

In the case of an additive manufacturing method, such as 3D printing, however, the volume of the rough model must lie within the volume of the fine model, because otherwise material is already applied to places where the fine model does not provide any material during the manufacture of the rough model.

The automatic design of the 3D rough model is performed in a preferred embodiment using artificial neural networks for machine learning (Convolutional Neural Network, CNN), such as deep learning. These techniques use 3D models of previous designs in order to learn how the 3D rough model can be determined. Using previous 3D models, the software can learn the dimensions of the dental component to be prepared. It is also possible that certain dimensions for the 3D rough model are stored in a table, which is then accessed.

It is usually advantageous, if the three-dimensional shape of the attachment element is captured or determined, at least in the areas that are intended to come into contact with the dental component to be designed, before the design of the 3D model and the design of the 3D model is performed on the basis of the captured or determined three-dimensional shape of the attachment element.

If the attachment element is an implant, an abutment or an implant body, the three-dimensional shape of the attachment element is already known. It is only necessary to determine which implant has been used. An additional capturing of the three-dimensional shape is usually not necessary.

However, if the attachment element is a correspondingly prepared tooth, the actual three-dimensional shape of the attachment element must be determined.

For this purpose, a silicone impression can be taken from the patient, for example, and a plaster model can then be molded and digitized.

In order to accelerate the procedure, however, it is advantageous if the capturing is intraoral and thus best performed with the assistance of a 3D scanner. At first, it is only necessary to capture the attachment element, i.e. the prepared tooth and possibly the adjacent teeth, for example.

This information is sufficient to begin the manufacture of the dental component, because it is already established what the maximum lateral expansion of the dental component is and how the surface of the 3D model of the dental component corresponding to the prepared tooth looks.

In general, the dentist will also produce a corresponding 3D image of the opposite jaw section. In addition, an image of the closed dentition is usually taken from the side, in order to determine the positioning of the two jaws and thus also of the dental component to be created relative to the opposing antagonist tooth.

During the three-dimensional capturing of the closed dentition and of the opposite jaw section, the manufacture of the dental component can already take place at least for the surface sections whose shape is already known.

In a further preferred embodiment, it is provided that a preparation contact surface is determined based upon the three-dimensional shape of the attachment element and in the first design step, a surface section which comes into contact with the preparation contact surface is included in the first 3D submodel. As soon as this surface section has been designed, the manufacture of the surface(s) of the dental component coming into contact with the preparation contact surface can begin.

The determination of the preparation contact surface can best be performed automatically using an algorithm. To define the preparation contact surface, a so-called preparation edge can be determined. The preparation edge delimits the preparation contact surface(s).

The preparation contact surface may include a portion of the surfaces that are intended to come into contact with the dental component. The preparation contact surface may also comprise all surfaces that are intended to come into contact with the dental component. It is also possible to include other surface sections in the first 3D submodel that should not come into contact with the dental component.

Frequently, the surface of the dental component to be manufactured has a top surface, which faces away from the attachment element, and a bottom surface, which faces the attachment element. The bottom surface therefore always includes the preparation edge.

In a preferred embodiment of the method, the first surface section is the bottom surface of the dental component to be manufactured, and the second surface section is the top surface of the dental component to be manufactured. The modeling of the bottom surface of the dental component to be manufactured is relatively simple and can be computer-controlled, without requiring the manual intervention of an experienced dentist, because in a known position of the attachment element and the adjacent teeth, the bottom surface is known and therefore no design-related intervention is required.

Even if the design of the bottom surface can be done relatively simple and therefore computer-assisted, the manufacture of this surface is often very time-consuming, in particular when the bottom surface is concavely curved and has a cavity for receiving the prepared tooth. Therefore, it is of great advantage if the manufacture of the bottom surface of the dental component to be manufactured can be begun while the dentist is still busy with the computer-assisted modelling of the cap surface of the dental component.

It may be advantageous if, in the second design step, first a 3D rough submodel and then the second 3D submodel are automatically designed using an algorithm, wherein the manufacture of the surface of the dental component corresponding to the 3D rough submodel is begun before the second design step is completed. Here, too, if a subtractive manufacturing method is used, the volume of the 3D rough submodel should be larger than the volume of the second 3D submodel or, if an additive manufacturing method is used, the volume of the 3D rough submodel is smaller than the volume of the second 3D submodel.

The modeling of the visible surface of the dental component is often time-consuming during the performance of the second design step. In addition, it must be determined at which places there should be contact between the dental component and the opposing tooth during chewing. In this case, the patient's time-consuming involvement may also be required. However, these essentially design-related interventions of the experienced dentist have only relatively small effects on the surface sections of the dental component to be manufactured.

With the 3D rough model, the rough shape of the dental component can easily be determined before the second design step is completed.

The automatic design of the 3D rough submodel is performed in a preferred embodiment using artificial neural networks for machine learning (Convolutional Neural Network, CNN), such as deep learning, as in the previously described 3D rough model. These techniques use 3D models of previous designs in order to learn how the 3D rough model can be determined. Using previous 3D models, the software can learn the dimensions of the dental component to be prepared. It is also possible that certain dimensions for the 3D rough model are stored in a table, which is then accessed.

It is also possible to refer to information that has become available in the meantime, i.e. after the design of the first 3D submodel, such as the lateral distance to adjacent teeth or the distance to the opposite tooth (antagonist).

In this embodiment, the 3D model is thus first subdivided into two 3D submodels, which each describe a different surface section. Once the first 3D submodel is designed, the manufacture of the dental component begins at the surface sections corresponding to the 3D submodel.

The second 3D submodel is in turn divided into two submodels, the rough submodel and the fine submodel. Here, too, the manufacture of the rough submodel can be begun as soon as it is designed. As soon as the time-consuming design of the fine submodel of the second 3D submodel is completed, the dental component, which has now been completed at some surface sections and has at least roughly the desired contour at other surface sections, can be fully manufactured.

Thus, according to the invention, at least part of the information available about the surface of the dental component to be manufactured before the complete design of the 3D model is used in order to begin the time-consuming manufacture of the dental component. As soon as further information is available, it can also be used to continue or improve the manufacture of the dental component. For example, in the second design step, the dentist might first design the lateral surfaces of the dental component to be manufactured before the top surface, i.e. the antagonist-facing surface, is designed. As soon as the design of the lateral surface is established, the manufacture of the lateral surfaces of the dental component can begin.

BRIEF DESCRIPTION OF THE DRAWINGS

Further advantages, features and possible applications of the present invention are explained using the following description of preferred embodiments and the accompanying figures. The following are shown.

DETAILED DESCRIPTION OF THE INVENTION

On the basis of FIGS. 1 to 6, a first embodiment of the method according to the invention is described.

Figure 1:
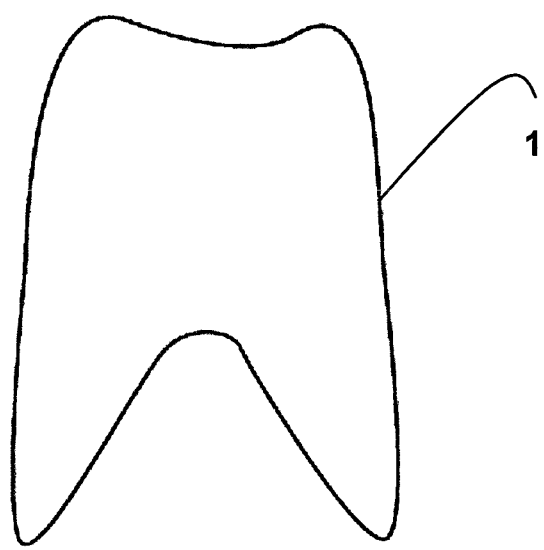
FIGS. 1 to 6 schematic representations of the individual steps of a first embodiment of the method according to the invention and FIG. 7 a schematic representation of a method step of a second embodiment of the inventive method.

In FIG. 1, the initial situation is shown as seen by the dentist or the patient concerned. An unprepared tooth 1 is firmly connected to the upper or lower jaw (not shown). The tooth consists of a crown, a tooth neck and the tooth root. The tooth root is anchored in the jawbone. If, for any reason, the crown is damaged or diseased, it may be necessary to replace or complete the natural crown with an artificial crown, i.e. a dental component. In the course of the diagnosis, the dentist will determine together with the patient which dental component type best addresses the needs of the patient in the present situation.

Possible dental component types are, for example, a dental inlay, a dental onlay, a dental overlay, veneers, crowns, bridges, implants, etc.

Based on the diagnosis, a corresponding restoration blank, the size of which is already adapted to the planned restoration, can be used in the CAM unit.

Figure 2:
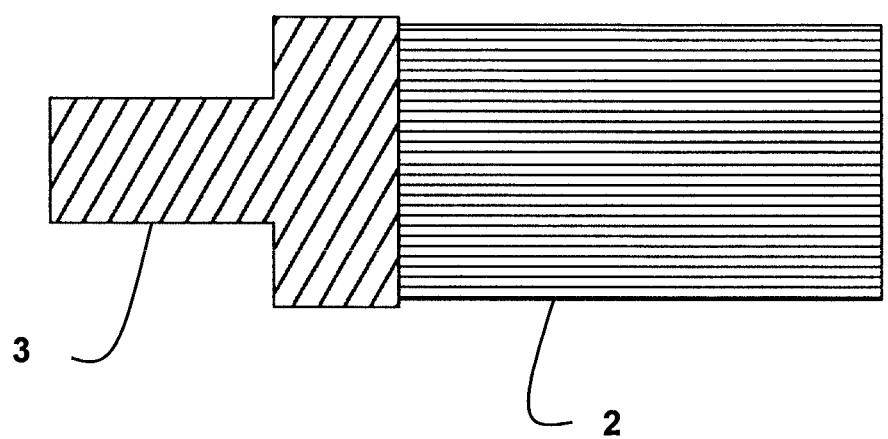
Figure 3:
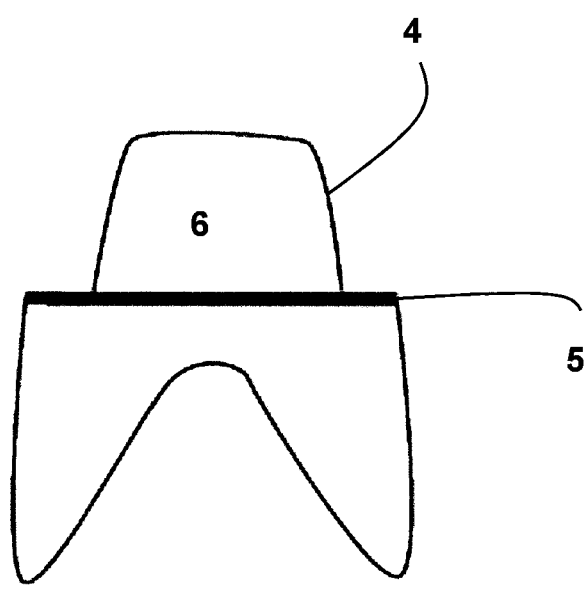

Such a restoration blank 2 is shown in FIG. 2. It is connected to a retainer 3, with which the restoration blank 2 can be attached in the CAM unit. The material of the restoration blank 2 can be selected at the discretion of the dentist, as long as it can be processed by the CAM unit. Full-ceramic blanks have lately been widely implemented. However, there are other materials, such as blanks made of solid metal or a metal alloy in combination with ceramic or plastic.

In the next step, the dentist prepares the diseased tooth. In the present example, this means that the natural tooth crown is ground all the way down to the gum line or even slightly below it. The natural crown is usually ground cylindrically or slightly conically. A step is created at the neck of the tooth. The tooth prepared in this manner is shown schematically in FIG. 3. The tooth root is connected to the jawbone. The crown 4 of the prepared tooth 4 is seen with a ground surface 6. Further, the preparation edge 5 is seen, which forms a step in the prepared tooth.

After preparation, the prepared tooth is digitized. In the preferred embodiment, this is performed digitally by means of an intraoral 3D scanner. Such intraoral 3D scanners are known and can be acquired in various embodiments. Such an intraoral scanner can, for example, be performed in true colors and powder-free according to the principle of active triangulation.

At the end of the digitizing process, there is the three-dimensional contour of the prepared tooth not covered by the gums or the jaw bone.

It is now necessary to determine the preparation edge, i.e. the limit of the preparation contact surface that comes into contact with the dental component to be prepared. This determination can either be performed manually by an experienced dentist or automatically with the assistance of an appropriate software. As soon as the preparation edge 5 has been determined, the shape of the corresponding surface section of the dental component to be manufactured is known. A corresponding 3D submodel of the dental component to be manufactured can then be simply created using a computer. Because the dental component is placed on the prepared tooth and must join precisely to the preparation edge, there is no design freedom on the surface of the dental component facing the prepared tooth, the so-called bottom surface, so that after identification of the preparation edge, the corresponding 3D submodel for the bottom side of the dental component can easily be created, and then the manufacture of the dental component can begin.

Figure 4:
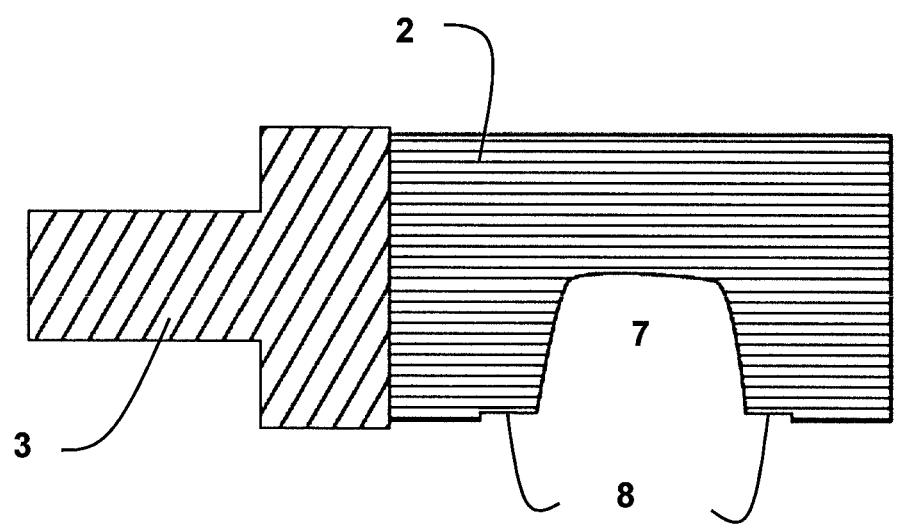

FIG. 4 shows the corresponding restoration blank 2 in which the negative of the preparation, i.e. the surface section of the first 3D submodel, has already been introduced. The surface sections 8 corresponding to the preparation edge 5 and the cavity 7 provided for receiving the prepared tooth 4 can be seen. This elaborate processing of the concave form can thus already be performed at a very early stage of the process.

At the same time, CAD-supported restoration planning, i.e. the design of the second 3D submodel, can be performed. An experienced dentist may determine the occlusion, interdental contacts, etc., with the assistance of an algorithm. For the purposes of preparation, it may also be necessary to digitize the adjacent teeth positioned next to the prepared tooth, the antagonist (opposing tooth), and the static occlusion of the patient's jaw, for example with an intraoral 3D scanner.

Figure 5:
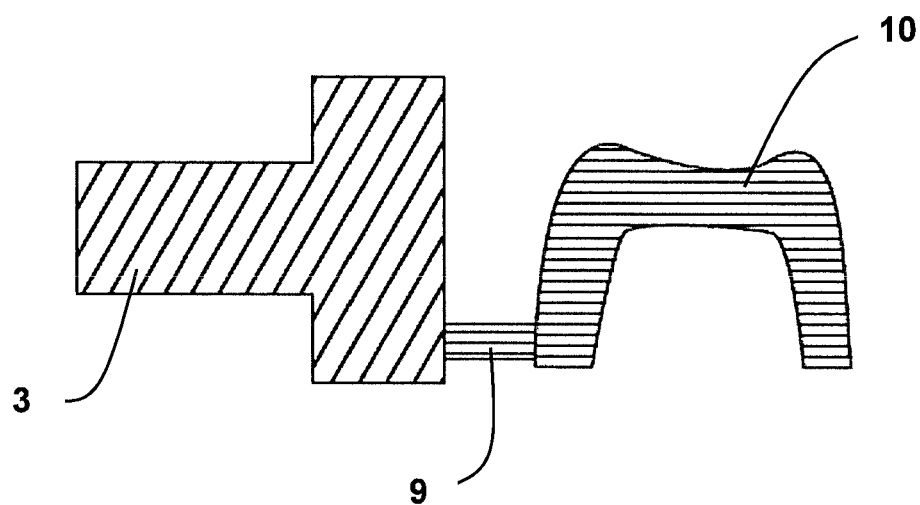

As soon as the second 3D submodel has been created, the dental component 10 can now also be processed from the opposite side, i.e. the top side. This stage is shown in FIG. 5.

The dental component 10 is still attached to the retaining element 3 solely via a retaining bar 9. The retaining bar 9 is cut off at the end of manufacture, and the area is polished by the dentist.

Figure 6:
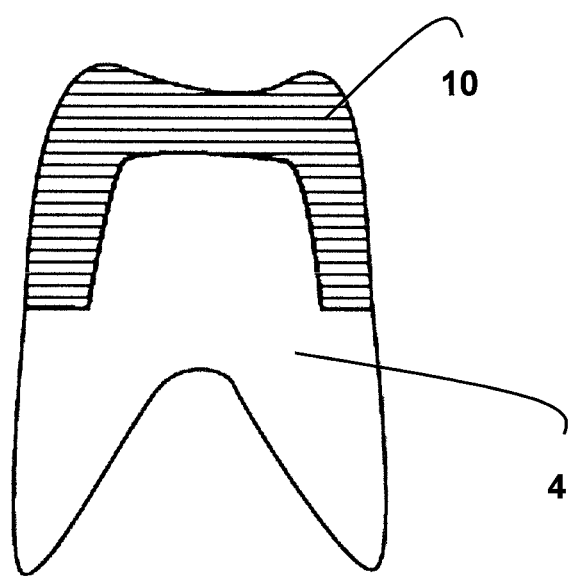

In FIG. 6, the dental component 10 has been placed on the prepared tooth crown 4. The dental component 10 can be glued to the tooth, for example with the assistance of a UV-curable adhesive.

Figure 7:
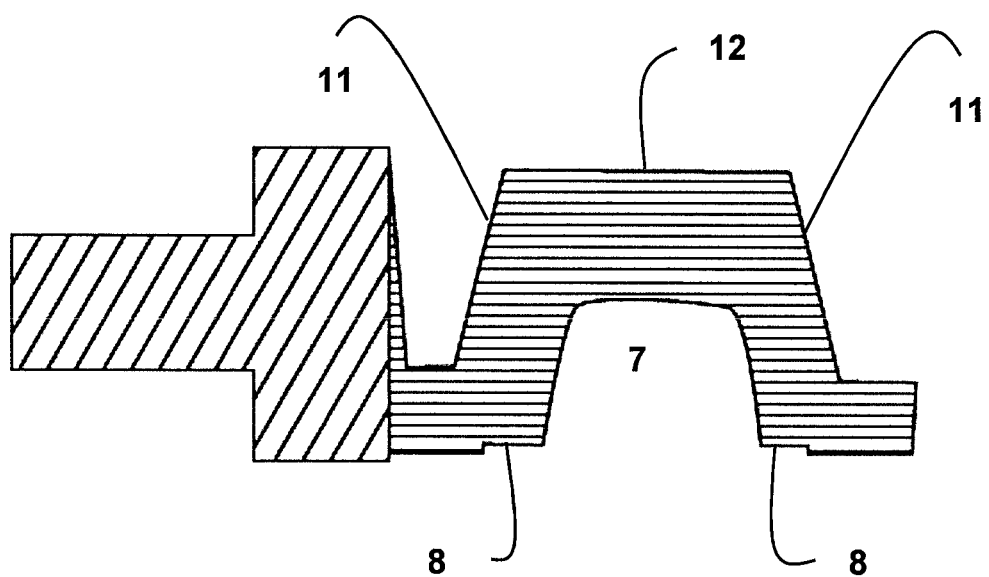

FIG. 7 schematically shows an alternative embodiment of the method.

Here, too, the prepared tooth is first digitized and then the bottom side of the dental component is formed. However, a 3D rough submodel is then first created for the second 3D submodel. This 3D rough submodel only roughly reflects the top side of the dental component to be manufactured, wherein it is ensured that the surface sections of the second 3D submodel are located within the contour of the 3D rough submodel. Thus, for example, a maximum possible height of the dental component can be calculated and an upper rough surface 12 can be manufactured, which represents the maximum height of the dental component. In addition, material can already be removed from the lateral surfaces of the dental component, so that the lateral rough surfaces 11 result.

As soon as the second 3D submodel has finally been created, processing of the surfaces 11 and 12 can then take place in order to arrive at the stage shown in FIG. 5.

Although the present application distinguishes between a CAD ("computer-aided design") unit and a CAM ("computer-aided manufacturing") unit, a CAD/CAM unit which takes over tasks from both the CAD unit and the CAM unit can be used instead.

LIST OF REFERENCE NUMBERS

1 Tooth
2 Restoration blank
3 Retaining element
4 Prepared tooth
5 Preparation edge
6 Ground surface
7 Cavity
8 Surface sections
9 Retaining bar
10 Dental component
11 Lateral rough surfaces
12 Upper rough surface

The invention claimed is:

1. A method comprising:
   manufacturing, from a block of material, a dental component that includes a physical surface, by:
   virtually designing, in a sequence and/or at different speeds using a CAD (computer-aided design) unit, a plurality of submodels of a 3D model of the dental component, the 3D model comprising the plurality of submodels by:
   virtually designing, in a first design step of the 3D model, a first 3D submodel of the 3D model to have a first virtual surface that corresponds to a first surface section of the dental component; and
   virtually designing, in a second design step of the 3D model, a second 3D submodel of the 3D model to have a second virtual surface that corresponds to a second surface section of the dental component;
   providing to a CAM (computer-aided manufacturing) unit the block of material from which the dental component is to be manufactured; and
   beginning a manufacturing of the first surface section of the dental component from the block of material, as part of the manufacture of the dental component, using the first 3D submodel before completing said virtually designing of the second 3D submodel;
   wherein the first design step is completed before the second design step is completed;
   wherein the CAM unit performs said manufacturing, and
   wherein the physical surface of the dental component is manufactured to include a top surface, which faces away from an attachment element connected to the jaw, and a bottom surface, which faces the attachment element, wherein the first surface section is the bottom surface of the dental component, and the second surface section is the top surface of the dental component.

2. The method according to claim 1, wherein the dental component is designed and manufactured as a component selected from the list consisting of an inlay, an onlay, an overlay, a veneer, a dental crown, a bridge, an implant crown, an immediate, bite splint and an impression tray.

3. The method according to claim 1, wherein the manufacture of the dental component is performed by an additive manufacturing method.

4. The method according to claim 3, wherein the additive manufacturing method is 3D printing.

5. The method according to claim 1, wherein said manufacture of the dental component is performed using a subtractive manufacturing method.

6. The method according to claim 5, wherein the subtractive manufacturing method is performed by a cutting process of material from a workpiece blank.

7. The method according to claim 5, wherein the manufacture of the dental component is performed by milling and/or grinding.

8. The method according to claim 1, wherein a first algorithm is used to design a 3D rough model as the first 3D submodel in the first design step, and in the second design step a 3D fine model is designed as the second 3D submodel, wherein either
   a) a subtractive manufacturing method is used and a volume of the 3D rough model limited by the first virtual surface is larger than another volume of the 3D fine model limited by the second virtual surface, or
   b) an additive manufacturing method is used and the volume of the 3D rough model limited by the first virtual surface is smaller than the another volume of the 3D fine model limited by the second virtual surface.

9. The method according to claim 8, further comprising: designing the 3D rough model automatically on the basis of a dental component type.

10. The method according to claim 8, further comprising designing the 3D rough model automatically using an artificial neural network for machine learning that learns from 3D models of previous designs.

11. The method according to claim 10, wherein the artificial neural network for machine learning is a Convolutional Neural Network.

12. The method according to claim 1, wherein in the second design step, first a 3D rough submodel is automatically designed using a third algorithm and then the second 3D submodel is designed, wherein the manufacture of the physical surface of the dental component corresponding to the 3D rough submodel is initiated before the second design step is completed, wherein either a) a subtractive manufacturing method is used and a volume of the 3D rough submodel is larger than another volume of the second 3D submodel, or b) an additive manufacturing method is used and the volume of the 3D rough submodel is smaller than the another volume of the second 3D submodel.

13. The method according to claim 12, further comprising: automatically designing the 3D rough submodel using an artificial neural network for machine learning that learns from previous designs.

14. The method according to claim 13, wherein the artificial neural network for machine learning is a deep learning Convolutional Neural Network; CNN.

15. The method according to claim 1, wherein the dental component designed to be fixed to the attachment element connected to a jaw, wherein prior to designing the 3D model, a three-dimensional shape of the attachment element is captured or determined, at least in areas that come into contact with the dental component, and the 3D model is designed on the basis of the three-dimensional shape of the attachment element.

16. The method according to claim 15, wherein the three-dimensional shape of the attachment element is captured with an assistance of a 3D scanner.

17. The method according to claim 15, wherein based on the three-dimensional shape of the attachment element, a virtual location of a physical preparation contact surface is determined, and in the first design step, another virtual surface of the 3D model corresponding to another surface section of the dental component, that comes into contact with the physical preparation contact surface, is included in the first 3D submodel, the first 3D submodel being formed to correspond to the preparation contact surface.

18. The method according to claim 17, wherein the virtual location of the physical preparation contact surface is performed automatically with the assistance of a second algorithm.

* * * * *